United States Patent
Otsubo

(10) Patent No.: US 10,690,820 B2
(45) Date of Patent: Jun. 23, 2020

(54) RETROREFLECTOR

(71) Applicant: Asukanet Company, Ltd., Hiroshima-shi, Hiroshima (JP)

(72) Inventor: Makoto Otsubo, Hiroshima (JP)

(73) Assignee: ASUKANET COMPANY, LTD., Hiroshima-shi, Hiroshima (JP)

( * ) Notice: Subject to any disclaimer, the term of this patent is extended or adjusted under 35 U.S.C. 154(b) by 85 days.

(21) Appl. No.: 15/759,958

(22) PCT Filed: Jul. 15, 2016

(86) PCT No.: PCT/JP2016/070990
§ 371 (c)(1),
(2) Date: Mar. 14, 2018

(87) PCT Pub. No.: WO2017/051598
PCT Pub. Date: Mar. 30, 2017

(65) Prior Publication Data
US 2018/0267216 A1    Sep. 20, 2018

(30) Foreign Application Priority Data

Sep. 25, 2015  (JP) .................................. 2015-188402

(51) Int. Cl.
*G02B 5/124*  (2006.01)
*G02B 27/22*  (2018.01)
(Continued)

(52) U.S. Cl.
CPC ............. *G02B 5/124* (2013.01); *G02B 5/122* (2013.01); *G02B 30/27* (2020.01); *G03B 35/24* (2013.01); *G02B 30/56* (2020.01)

(58) Field of Classification Search
CPC .......... G02B 5/12; G02B 5/122; G02B 5/124; G02B 5/136; G02B 27/2214;
(Continued)

(56) References Cited

U.S. PATENT DOCUMENTS 4,938,563 A *  7/1990  Nelson .................. G02B 5/124
                                                 359/530
2008/0198459 A1*  8/2008  Fergason ................. G02B 5/12
                                                 359/529
(Continued)

FOREIGN PATENT DOCUMENTS

CN         1038885 A      1/1990
CN       101952747 A      1/2011
(Continued)

OTHER PUBLICATIONS

International Search Report dated Oct. 11, 2016, issued in counterpart International Application No. PCT/JP2016/070990(2 pages).
(Continued)

*Primary Examiner* — William R Alexander
*Assistant Examiner* — Ephrem Z Mebrahtu
(74) *Attorney, Agent, or Firm* — Westerman, Hattori, Daniels & Adrian, LLP

(57) ABSTRACT

A retroreflector 10 is provided, which includes light reflecting grooves 11a arranged in parallel and partition walls 15 that are arranged in parallel at predetermined intervals and that orthogonally intersect with the light reflecting grooves 11a on an upper side 12 of a flat plate block 11, in which the light reflecting groove 11a is provided with first and second light reflecting surfaces 13 and 14 that orthogonally intersect with each other, and the partition wall 15 is provided with a draft that upwardly becomes smaller in width, and the partition wall 15 has a perpendicular light-reflecting surface 19 orthogonally intersecting with the first and second light reflecting surfaces 13 and 14 on its one side.

8 Claims, 10 Drawing Sheets

(51) Int. Cl.
*G03B 35/24* (2006.01)
*G02B 30/27* (2020.01)
*G02B 5/122* (2006.01)
*G02B 30/56* (2020.01)

(58) Field of Classification Search
CPC ............... E04D 13/033; E06B 3/6715; E06B 2009/2417; F21S 11/00; F21S 11/002; F21S 11/007
See application file for complete search history.

(56) References Cited

U.S. PATENT DOCUMENTS

| | | | |
|---|---|---|---|
| 2010/0177402 A1 | 7/2010 | Maekawa | |
| 2010/0265585 A1 | 10/2010 | Kim et al. | |
| 2014/0036367 A1* | 2/2014 | Smith | B29D 11/00605 359/530 |
| 2014/0055858 A1* | 2/2014 | Chapman | G02B 1/118 359/530 |
| 2014/0345967 A1* | 11/2014 | Tillotson | G02B 5/136 181/141 |
| 2014/0347731 A1* | 11/2014 | Tillotson | G02B 5/122 359/529 |

FOREIGN PATENT DOCUMENTS

| | | |
|---|---|---|
| CN | 104737038 A | 6/2015 |
| JP | 11-296113 A | 10/1999 |
| JP | 2009-25776 A | 2/2009 |
| JP | 2011-511303 A | 4/2011 |
| JP | 2012-14194 A | 1/2012 |
| JP | 2016-57346 A | 4/2016 |
| JP | 2016-71047 A | 5/2016 |
| JP | 2016-80937 A | 5/2016 |
| JP | 2016-114754 A | 6/2016 |
| KR | 10-2007-0102329 A | 10/2007 |
| KR | 10-2014-0146904 A | 12/2014 |
| WO | 99/46616 A1 | 9/1999 |
| WO | 2014/051867 A2 | 4/2014 |

OTHER PUBLICATIONS

Extended (supplementary) European Search Report dated Jun. 4, 2019, issued in counterpart EP Application No. 16848388.1. (6 pages).
Notification of Reason for Refusal dated Apr. 30, 2019, issued in counterpart KR Application No. 10-2018-7011384, with English machine translation. (6 pages).
Office Action dated Nov. 4, 2019, issued in counterpart CN application No. 201680054811.7, with English translation. (14 pages).

* cited by examiner

RETROREFLECTOR

TECHNICAL FIELD

The present invention relates to a retroreflector that has at least three light reflecting surfaces and that is, according to circumstances, usable also as a stereoscopic-image display device for reflecting light emitted from an object (display, real image, physical solid, etc.) and then condensing the light and forming an image in another space.

BACKGROUND ART

Patent Document 1 proposes a retroreflector in which reflective elements (light reflecting units) each of which is formed by combining a pair of corner reflecting surfaces that come into contact with each other at a dihedral angle of substantially 90 degrees and a perpendicular reflecting surface formed on a partition wall orthogonally intersecting with the corner reflecting surfaces are arranged in an orderly manner. Patent Document 2 proposes a stereoscopic-image display device in which a half mirror is additionally incorporated with a retroreflector.

Patent Document 3 proposes an optical image-formation device in which first and second optical control panels formed by arranging belt-shaped planar light-reflecting portions perpendicularly to a surface on one side inside a transparent flat plate are used and in which the first and second optical control panels are disposed so that the planar light-reflecting portions of the first and second optical control panels orthogonally intersect with each other, and the optical image-formation device is capable of forming an image of an object placed on one side as a real image at a symmetrical position.

PRIOR ART DOCUMENTS

Patent Literature

Patent Document 1: Japanese Translation of International Application (Kohyo) No. 2011-511303
Patent Document 2: Japanese Published Unexamined Patent Application No. 2009-25776
Patent Document 3: Japanese Published Unexamined Patent Application No. 2012-14194

SUMMARY OF THE INVENTION

Problems to be Solved by the Invention

However, in the retroreflector mentioned in Patent Document 1, a third reflecting surface with respect to the first and second reflecting surfaces orthogonally intersecting with each other is formed by a parallel groove, and therefore a problem has resided in the fact that the retroreflector has difficulty in being shaped by pressing or dieing.

In the technique mentioned in Patent Document 2, a planar corner cube that has three surfaces perpendicular to each other is used, and therefore a problem has resided in the fact that the technique has difficulty in forming a precise planar corner cube.

The device mentioned in Patent Document 3 is required to have two optical control panels, and has difficulty in manufacturing a large-sized optical control panel, and therefore it is impossible to produce the device at low cost as a whole, and it has been difficult to manufacture an even larger-sized optical image-formation device.

The present invention has been made in consideration of these circumstances, and aims to provide a retroreflector that is capable of being formed in a flat plate shape, that is capable of being mass-produced, that is capable of becoming larger in size if the retroreflectors are arranged in an orderly manner, and that is capable of being used also as a stereoscopic-image display device according to circumstances.

Means for Solving the Problems

The retroreflector according to a first aspect of the present invention for the aim is a retroreflector that includes light reflecting grooves arranged in parallel and partition walls that are arranged in parallel at predetermined intervals and that orthogonally intersect with the light reflecting grooves, the light reflecting grooves and the partition walls being on an upper side of a flat plate block, and the light reflecting groove is provided with first and second light reflecting surfaces that orthogonally intersect with each other, and the partition wall is provided with a draft that upwardly becomes smaller in width, and the partition wall has a perpendicular light-reflecting surface that orthogonally intersects with the first and second light reflecting surfaces on one side of the partition wall.

In the retroreflector according to the first aspect of the present invention, the partition wall is provided with an inclined light-reflecting surface that intersects with the first and second light reflecting surfaces at a same angle on one other side of the partition wall, and a retroreflector according to a second aspect of the present invention is usable also as a stereoscopic-image display device that uses the first and second light reflecting surfaces and the inclined light-reflecting surface.

Preferably, in the retroreflector according to the first and second aspects of the present invention, a height h of the partition wall falls within such a range as to be 0.9 to 1.5 times as great as a height a of a cross section of a right-angled triangle formed by the first and second light reflecting surfaces.

Preferably, in the retroreflector according to the first and second aspects of the present invention, a width w1 of a maximum thickness part of the partition wall falls within such a range as to be 0.1 to 1 times as great as a length b of an intersection line of the first and second light reflecting surfaces.

It is also possible to make the retroreflector as an even larger-sized, highly-effective (high in brightness and in reflectivity) retroreflector by arranging a plurality of retroreflectors each of which is the retroreflector according to the first and second aspects of the present invention in an orderly manner on a same plane and by using more first and second reflecting surfaces and more perpendicular light-reflecting surfaces each of which is the aforementioned one and that are formed on a front side of the flat plate block.

Additionally, it is also possible to make an even larger-sized, highly-effective stereoscopic-image display device by arranging a plurality of retroreflectors each of which is the retroreflector according to the second aspect of the present invention in an orderly manner on a same plane and by using more first and second reflecting surfaces and more inclined light-reflecting surfaces each of which is the aforementioned one and that are formed on a front side of the flat plate block.

Effects of the Invention

In the retroreflector according to the first aspect of the present invention, the light reflecting groove is provided with the first and second light reflecting surfaces orthogonally intersecting with each other, and the partition wall having the perpendicular light-reflecting surface that is formed on its one side and that orthogonally intersects with the first and second light reflecting surfaces is provided with a draft that upwardly becomes smaller in width, and therefore it becomes possible to extremely easily perform shaping by use of dieing or pressing. Particularly when the retroreflector is formed by molding by use of a thermoplastic resin, it becomes possible to manufacture the retroreflector extremely easily and at low cost.

Although each of the light reflecting surfaces is formed by applying specular processing of vapor deposition or of sputtering onto a metal, such as aluminum, having high reflectivity, it is merely necessary to apply specular processing only to the front side of a flat plate block.

A retroreflector that has the same operation as a corner cube reflector is formed by the first and second light reflecting surfaces and the perpendicular light-reflecting surface. Herein, if light is allowed to strike a flat plate block (for example, rectangular parallelepiped block) from the front side (upper side) of the flat plate block, there is no optical attenuation caused by through-material transmission because there is no material through which light passes, and therefore it is possible to obtain retroreflective properties having higher brightness.

Additionally, it is possible to obtain an even larger-sized retroreflector by arranging a plurality of retroreflectors each of which is the aforementioned retroreflector in an orderly manner, and the device produced by erecting a half mirror at the thus-arranged retroreflectors becomes a large-sized stereoscopic-image display device.

Additionally, the retroreflector according to the second aspect of the present invention, fulfills the function as the aforementioned retroreflector, and also has a function as a stereoscopic-image display device because the inclined light-reflecting surface is disposed with respect to the first and second light reflecting surfaces orthogonally intersecting with each other, and because there is no coincidence between the direction of reflected light that is reflected by the first and second light reflecting surfaces and by the inclined light-reflecting surface and the direction of incident light that strikes the first and second light reflecting surfaces and the inclined light-reflecting surface (i.e., in this case, retroreflection does not occur). In other words, many first and second light reflecting surfaces and many inclined light-reflecting surfaces are disposed while keeping the attitude (angle) of each of the light reflecting surfaces constant, and therefore light reflected by the first and second light reflecting surfaces and by the inclined light-reflecting surface forms an image. This makes it possible to allow light emitted from an object (display, real image, physical solid, etc.) to form an image at a position differing from the position of the object.

MODES FOR CARRYING OUT THE INVENTION

Figure 1:
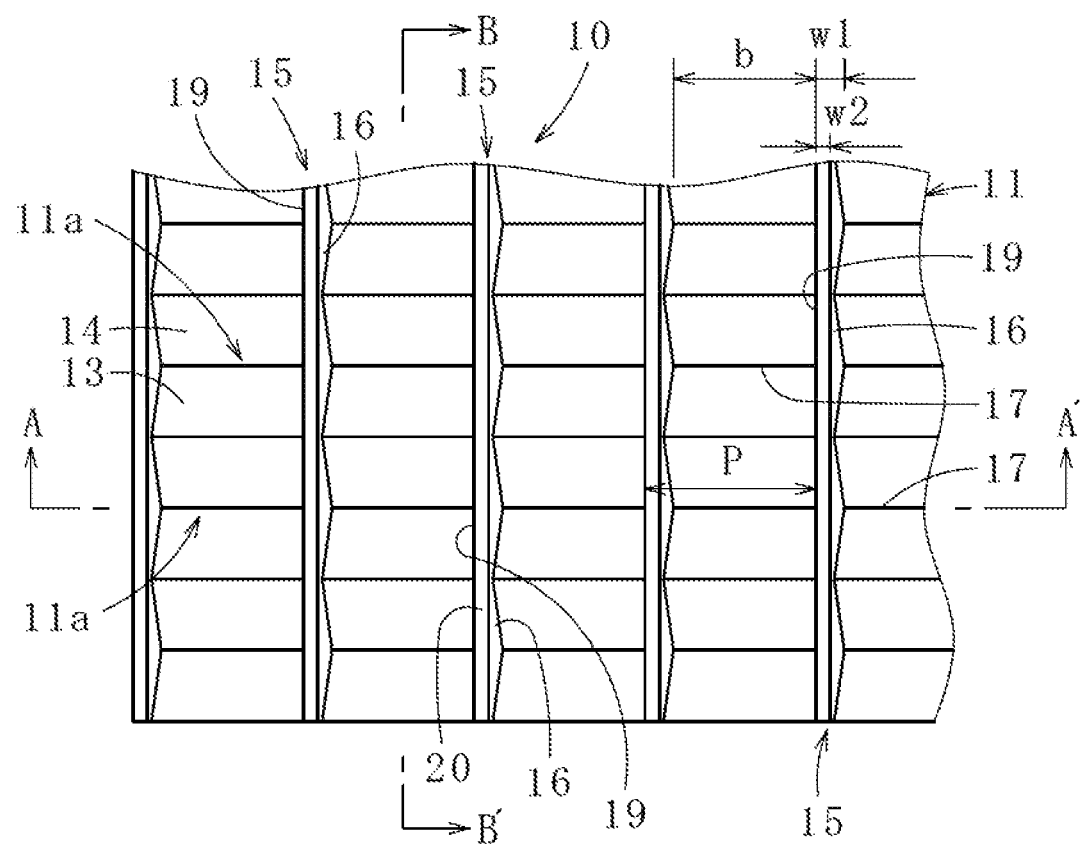
FIG. 1 is a plan view of a retroreflector, a part of which has been excluded, according to an embodiment of the present invention.

Subsequently, an embodiment in which the present invention is embodied will be described with reference to the accompanying drawings. As shown in FIG. 1 to FIG. 4, a retroreflector 10 according to an embodiment of the present invention includes light reflecting grooves 11a that are disposed in parallel with each other and each of which has a cross section of an isosceles right triangle and partition walls 15 that are disposed in parallel with each other at predetermined pitches and that cross (orthogonally intersect) the light reflecting grooves 11a on an upper side 12 of a flat-plate block 11 made of, for example, an opaque or transparent resin (e.g., thermoplastic resin, such as methacrylic resin, polycarbonate, olefin resin, or acrylic resin, or other thermosetting resins). The light reflecting groove 11a has first and second light reflecting surfaces 13 and 14 that are right-angularly arranged in parallel and alternate manners. The partition wall 15 partitions the first and second light reflecting surfaces 13 and 14 arranged in an orderly manner at predetermined pitches. These will be hereinafter described in detail.

Figure 2:
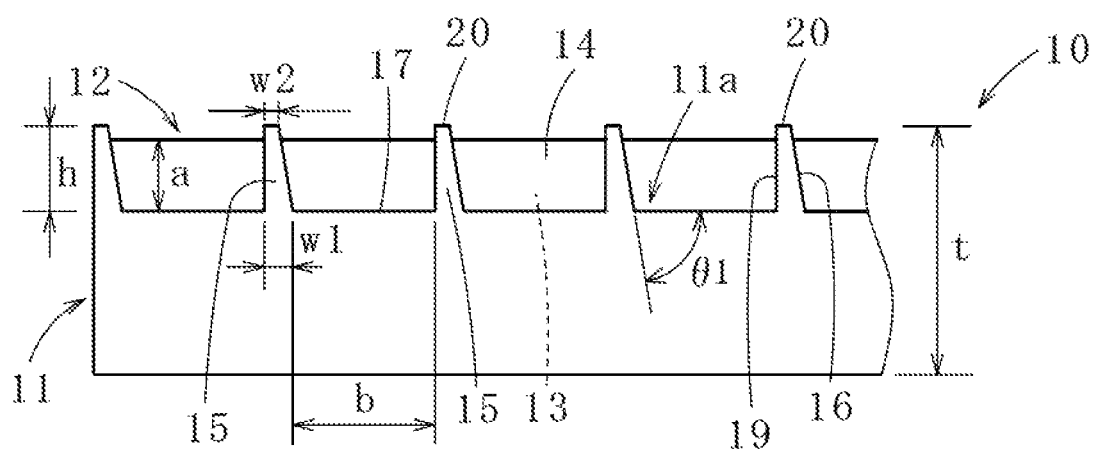
FIG. 2 is a cross-sectional view taken along arrowed line A-A' of FIG. 1.
Figure 3:
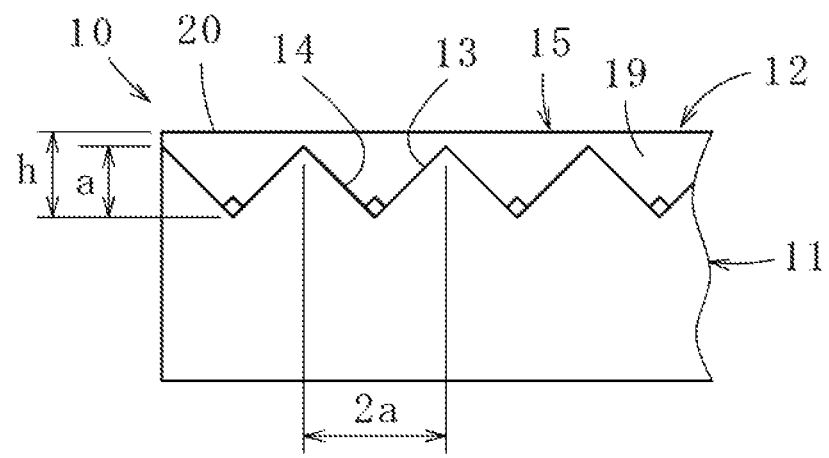
FIG. 3 is a cross-sectional view taken along arrowed line B-B' of FIG. 1.
Figure 4:
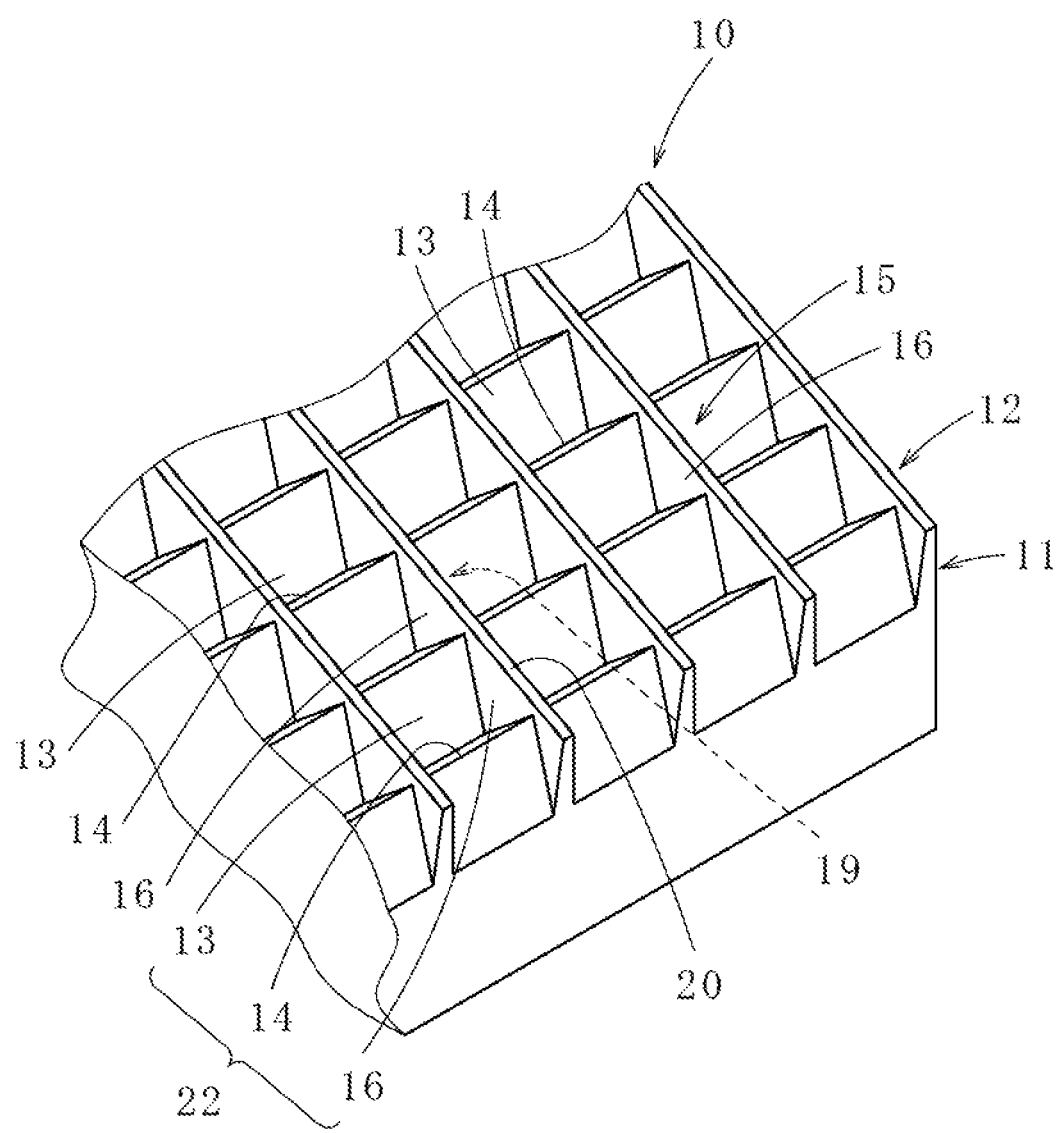
FIG. 4 is a perspective view of the retroreflector.

A perpendicular light-reflecting surface (fourth light reflecting surface) 19 that orthogonally intersect with the first and second light reflecting surfaces 13 and 14 is formed on one side of the partition wall 15, whereas an inclined light-reflecting surface (third light reflecting surface) 16 that is disposed so as to be inclined with respect to the first and second light inflecting surfaces 13 and 14 in a non-orthogonal state and that intersects with the first and second light reflecting surfaces 13 and 14 at the same angle is formed on the other side of the partition wall 15. The "non-orthogonal state" mentioned here denotes that the inclined light-reflecting surface 16 is not perpendicular to the first and second light reflecting surfaces 13 and 14 or is not perpendicular to an intersection line (bottom line) 17 in which the first and second light reflecting surfaces 13 and 14 intersect with each other, and, broadly speaking, denotes that an inclination angle θ1 of the inclined light-reflecting surface 16 falls within the range of, for example, 50 to 89 degrees (more preferably 70 to 88 degrees) with respect to the intersection line 17 of the first and second light reflecting surfaces 13 and 14 as shown in FIG. 2.

If θ1 is an acute angle, the width of the partition wall 15 becomes narrower toward the upper side (i.e., it has a draft), and therefore there exists an advantage that it becomes easy to perform pattern-draw-molding during resin molding. Additionally, the position of a to-be-formed real image is changed by the inclination of the inclined light-reflecting surface 16, and therefore its inclination angle is appropriately determined within a range in which an image can be formed.

Although the height h of the partition wall 15 and the height a of the cross section of an isosceles right triangle formed by the first and second light reflecting surfaces 13 and 14 are expressed as height h>height a in order to make a distinction between these heights as shown in FIG. 1 to FIG. 4, it is preferable to be expressed as height h=height a as shown in FIG. 5 to FIG. 8, and it becomes extremely easy to manufacture these components. Additionally, it is preferable to provide a planar portion at the upper end of the partition wall 15, and this enables the partition wall 15 to become strong and not to be easily broken, hence improving dimensional accuracy.

A method for manufacturing the first and second light reflecting surfaces 13 and 14, the inclined light-reflecting surface 16, and the perpendicular light-reflecting surface 19 is performed such that the light reflecting grooves 11a each of which has a cross section of an isosceles right triangle corresponding to the first and second light reflecting surfaces 13 and 14 and the partition walls 15 each of which has the inclined light-reflecting surface 16 and the perpendicular light-reflecting surface 19 are formed on the upper side 12 by use of a thermoplastic resin, and the flat plate block 11 is formed. Thereafter, metals of aluminum, tin, titanium, chrome, nickel, and silver are vapor-deposited thereon, and a light reflecting surface is formed.

In this case, the upper side 12 of the transparent flat plate block 11 is in a wholly metal-deposited state, and therefore metal deposition is applied onto not only the cross section of the right-angled triangle of the light reflecting groove 11a but also the surface of the partition wall 15, and a specular surface is formed.

Accordingly, the first and second light reflecting surfaces 13 and 14, the inclined light-reflecting surface 16, and the perpendicular light-reflecting surface 19 are formed, and a light reflecting surface 20 is also formed on an upper surface of the partition wall 15. It should be noted that it is also possible to change the height h of the partition wall 15 as shown in FIG. 1 to FIG. 8, hence enabling the height h to be 0.9 to 1.5 times as great as the height a of the cross section of right-angled (isosceles) triangle formed by the first and second light reflecting surfaces 13 and 14, and enabling the length b (minimum width, i.e., the length of the intersection line 17) between the partition walls 15 of the first and second light reflecting surfaces 13 and 14 to be 1 to 2.5 times (more preferably 1.1 to 2.2 times, and even more preferably 1.2 to 1.8 times) as great as the height a. Preferably, the light reflecting surface 20 is formed as small as possible, and this makes it possible to effectively use the first and second light reflecting surfaces 13 and 14.

The width w1 of a maximum thickness part of the partition wall 15 falls within the range of, for example, (0.1 to 1) b, and the thickness w2 of a thin part thereof is determined by the inclination angle (θ1) of the inclined light-reflecting surface 16. Therefore, the pitch P of the partition wall 15 becomes b+w1. Preferably, the thickness t of the flat plate block 11 falls within such a range as to be, for example, 3 to 20 times as great as the height h although no specific limitations are imposed on the thickness t. The thickness t of the flat plate block 11 is determined by the number of the first and second light reflecting surfaces 13 and 14. If it is thickened, its strength increases as a whole, and, if it is thinned, its strength becomes insufficient in some cases although its storage becomes compact. The present invention is not limited to these numerals, and is configured in different ratios when needed.

Figure 5:
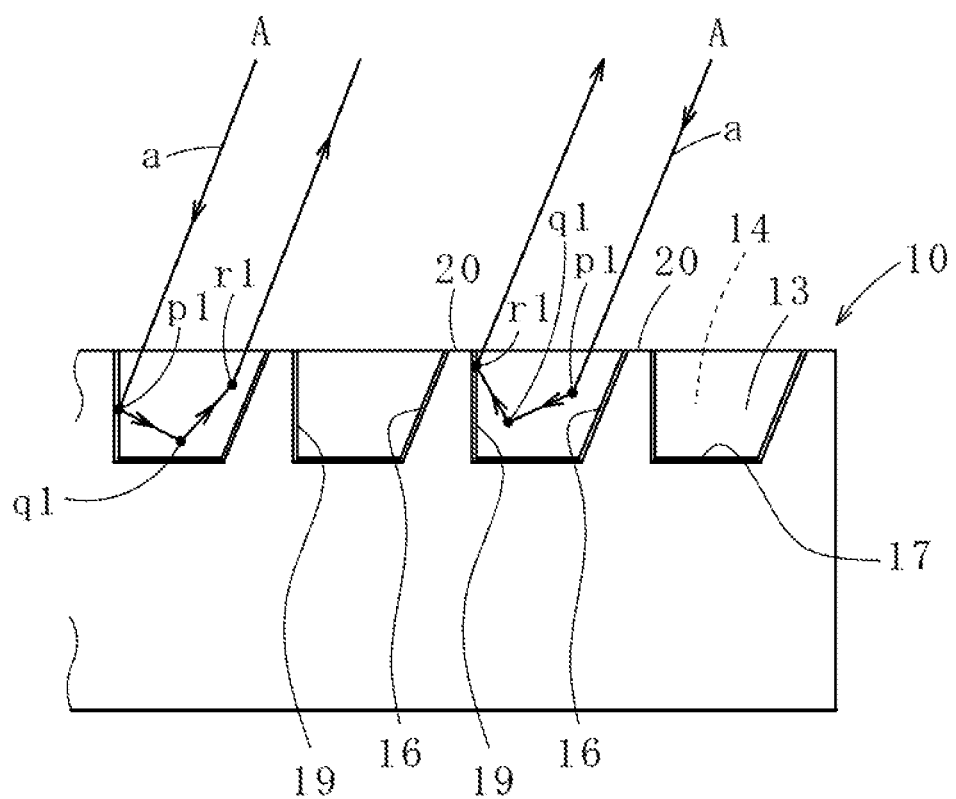
FIG. 5 is a descriptive view of an operational state of the retroreflector.
Figure 6:
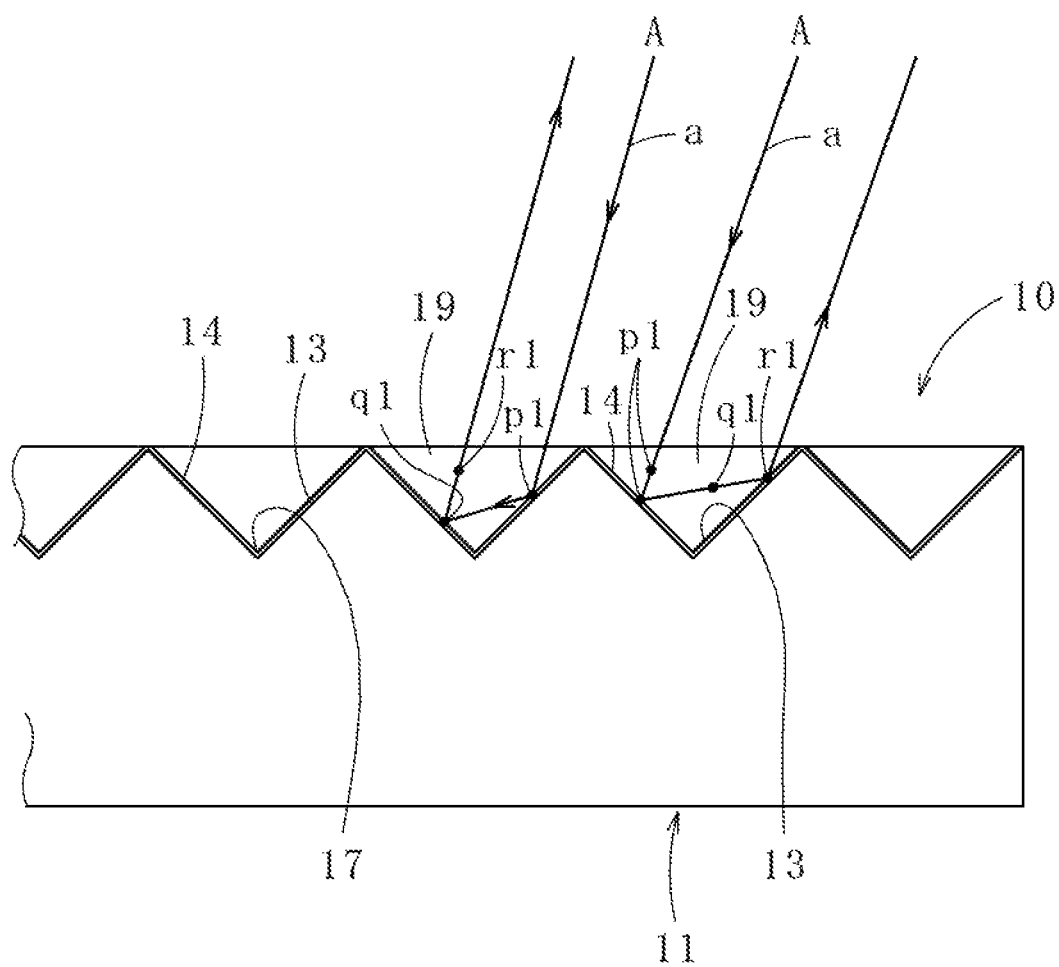
FIG. 6 is a descriptive view of an operational state of the retroreflector.

Subsequently, the operation of the retroreflector 10 will be described with reference to FIG. 5 and FIG. 6. First, light (incident light a) emitted from an object A strikes the first and second light reflecting surfaces 13 and 14 and the perpendicular light-reflecting surface 19. In this case, the position of a light generation source and the position of the retroreflector 10 are adjusted so that the incident light a strikes the perpendicular light-reflecting surface 19, e.g., so that light streams in from a right oblique direction in FIG. 5. In other words, the inclined light-reflecting surface 16 is set so as to serve as a shadow with respect to the incident light a. The first and second light reflecting surfaces 13 and 14 and the perpendicular light-reflecting surface 19 are disposed so as to orthogonally intersect with each other, and hence operate as cubic corners, and perform reflection three times at points p1, q1, and r1, and perform retroreflection in which light is emitted in the same direction as the incident light a.

In this embodiment, light that strikes the first and second light reflecting surfaces 13 and 14 and the perpendicular light-reflecting surface 13 does not pass through a medium other than air, and therefore it is possible to obtain retroreflective light that has no optical attenuation and that is bright.

Next, referring to FIG. 7 and FIG. 8, a case will be described in which the retroreflector 10 is used as a stereoscopic-image display device. In this case, light emitted from a to-be-targeted object A is set so as to strike the inclined light-reflecting surface 16 in addition to the first and second light reflecting surfaces 13 and 14, and is set so as not to strike the perpendicular light-reflecting surface 19.

For example, light emitted from the object A is reflected at the second light reflecting surface 14 (p1, p2) and the first reflecting surface 13 (q1, q2), and is reflected at the inclined light-reflecting surface 16 (r1, r2). Herein, if the inclined light-reflecting surface 16 is perpendicular to the first and second light reflecting surfaces 13 and 14, it acts as a retroreflector, and the direction of incident light and the direction of reflected light become identical with each other, and light is condensed at a part of the object A, and is invisible as an image. However, the inclined light-reflecting surface 16 is inclined with respect to the first and second light reflecting surfaces 13 and 14, and therefore a real image B is formed at another position. Although optical paths for the aforementioned light are each shown by the solid line in FIG. 7 and FIG. 8, angles of the reflected light of the first and second light reflecting surfaces 13 and 14 and of the inclined light-reflecting surface 16 are not accurately shown because it is a schematic view (the same applies to the following examples).

Figure 7:
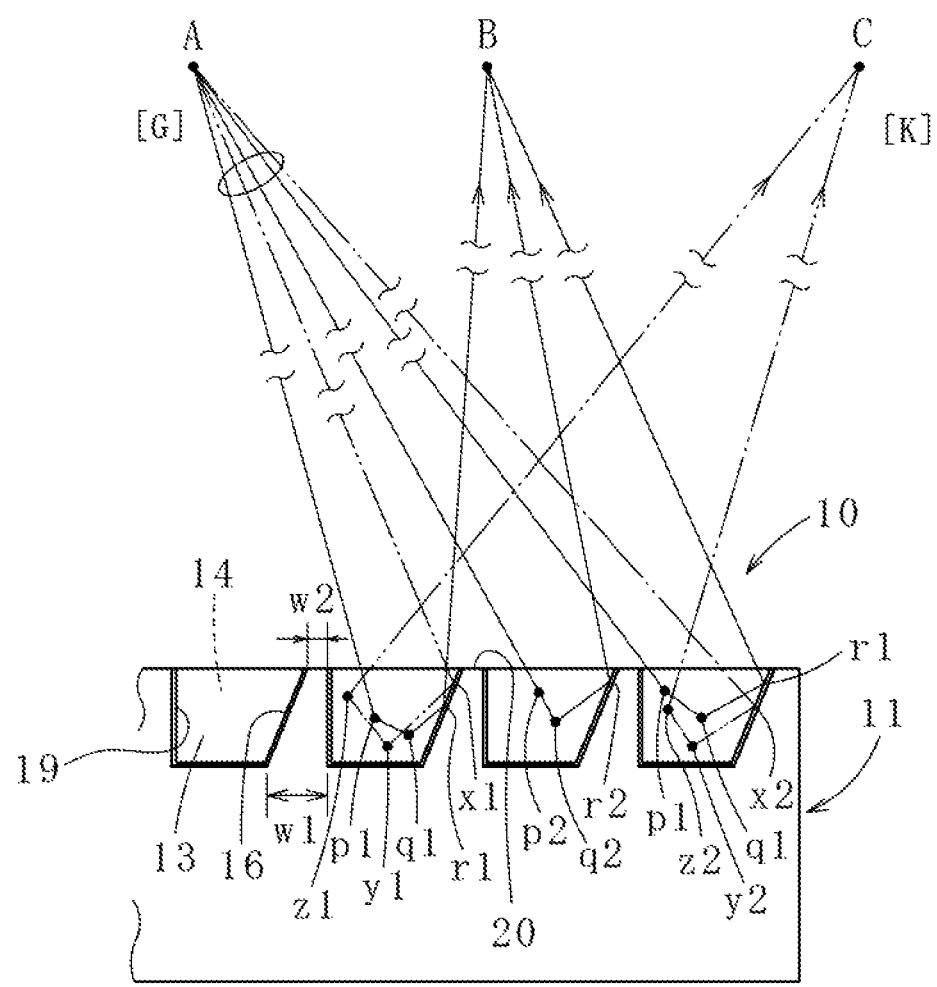
FIG. 7 is a descriptive view when the retroreflector is operated as a stereoscopic-image display device.
Figure 8:
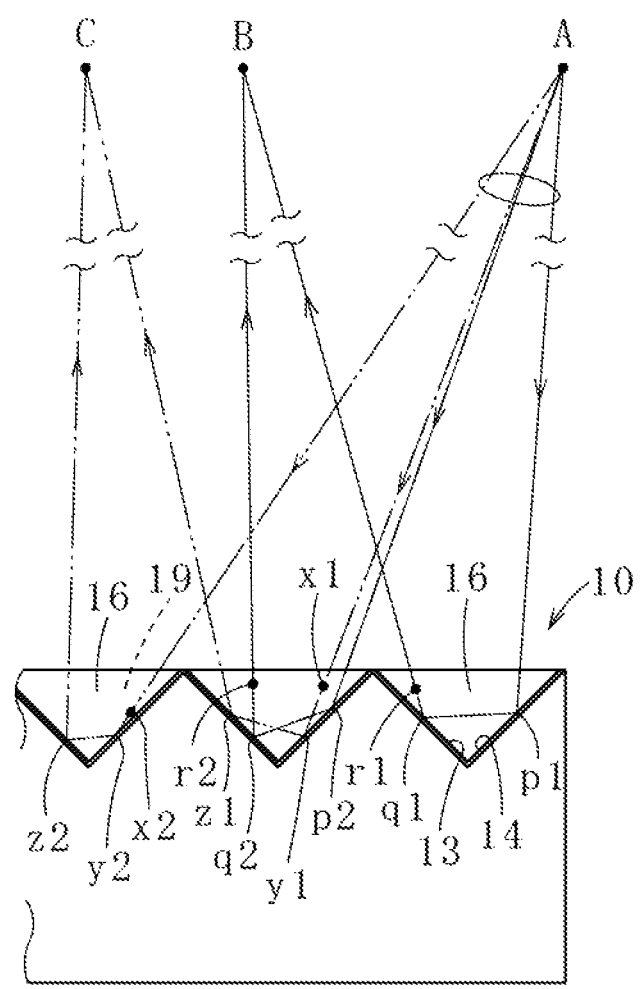
FIG. 8 is a descriptive view when the retroreflector is operated as a stereoscopic-image display device.

Next, optical paths are each shown by the alternate long and two short dashes line in FIG. 7 and FIG. 8 when light emitted from the object A strikes the inclined light-reflecting surface 16, and is then reflected, and is reflected at the first and second light reflecting surfaces 13 and 14. In other words, light emitted from the object A is reflected at the inclined light-reflecting surface 16 (x1, x2), and is reflected at the second light reflecting surface 14 (y1, y2), and is reflected at the first light reflecting surface 13 (z1, z2), and a real image C is formed. There is a possible case in which light emitted from the object A is reflected at the first light reflecting surface 13 (q1, q2), the second light reflecting surface 14 (p1, p2), and the inclined light-reflecting surface 16 (r1, r2), and a real image B is formed. Although the real image C is formed at a position differing from that of the real image B in some cases, it is also possible to form a single real image B (or real image C) by selecting the position and angle of the object A and the retroreflector 10 or, alternatively, by interposing a shield between the object A and the retroreflector 10 (a case in which only the real image B is formed will be hereinafter described).

In this retroreflector 10, the inclined light-reflecting surface 16 is inclined with respect to the first and second light reflecting surfaces 13 and 14, and therefore retroreflection is not performed, and light reflected from the first and second light reflecting surfaces 13 and 14 and from the inclined light-reflecting surface 16 comes off from the position of the object A. Many light reflecting units 22 (small blocks, see FIG. 4) each of which includes the first and second light reflecting surfaces 13 and 14 and the inclined light-reflecting surface 16 are planarly arranged while maintaining angular positions of the first and second light reflecting surfaces 13 and 14 and of the inclined light-reflecting surface 16 (i.e., in the same attitude), and therefore these rays of light gather at the same position. Therefore, light emitted from the object A is reflected by the plurality of light reflecting units 22, and a real image B is formed.

In this embodiment, if the object A exists on a side on which light is emitted toward the inclined light-reflecting surface 16 of each of the light reflecting units 22 (for example, a [G] side in FIG. 7), a real image B is formed, and, if the object A exists on a [K] side in FIG. 7, light {ray} emitted from the object A is reflected at the perpendicular light-reflecting surface 19 and at the first and second light reflecting surfaces 13 and 14, and therefore retroreflection is performed, and an image is not formed. Likewise, light reflected by the reflecting surface 20 does not form an image.

Figure 9:
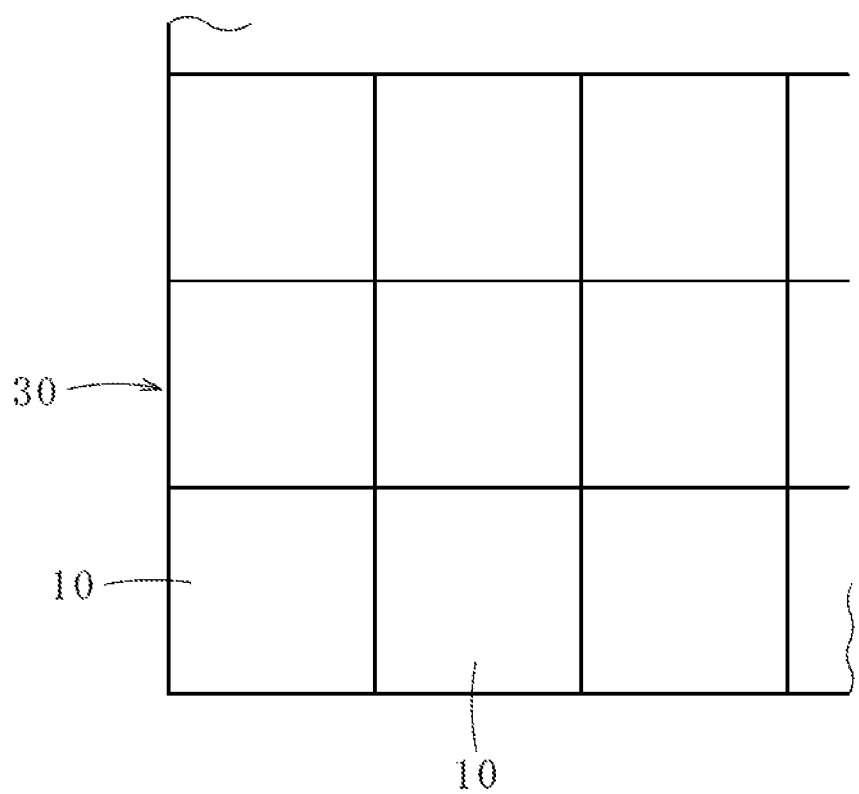
FIG. 9 is a schematic plan view of a large-sized retroreflector that uses the retroreflector.

Next, a retroreflector 30 shown in FIG. 9 will be described. The retroreflector 30 is made by preparing and arranging a plurality of retroreflectors 10 each of which is square or rectangular in a plan view on the same plane, and, as a result, the retroreflector 30 is an even larger-sized and highly effective device. Preferably, in this case, the large-sized retroreflector 30 made by arranging the retroreflectors 10 is rectangular in shape, and yet the present invention is not limited to that shape.

Preferably, in the retroreflector 10, the partition walls 15 follow the same direction. Although it is preferable to uniform the directions of the first and second light reflecting surfaces 13 and 14 of the retroreflector 10, these directions are not required to be arranged on the same straight line. The same applies to a case in which a stereoscopic-image display device is made by using the first and second light reflecting surfaces 13 and 14 and the inclined light-reflecting surface 16.

Figure 10:
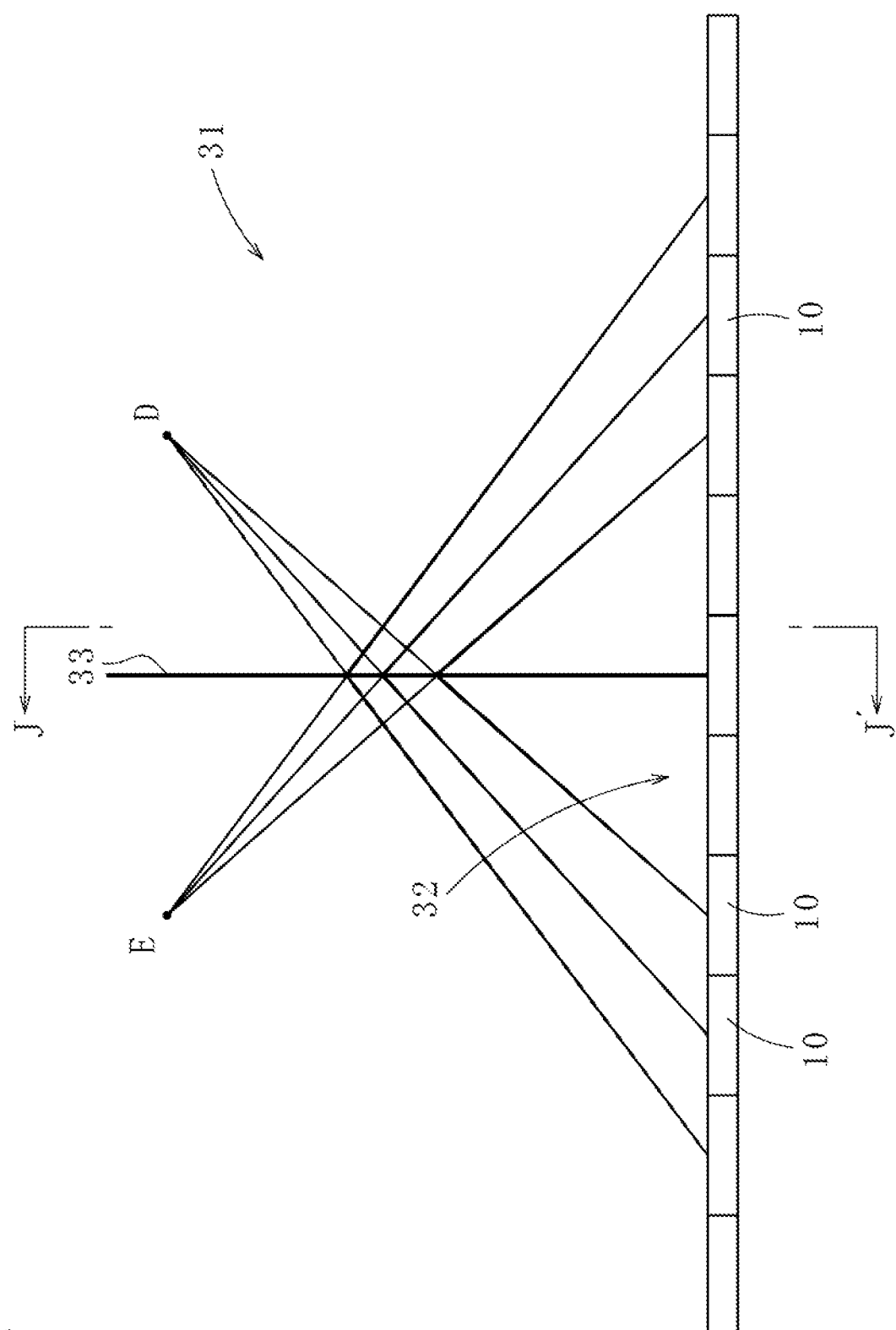
FIG. 10 is a descriptive view of a large-sized stereoscopic-image display device that uses the retroreflector.

As shown in FIG. 10, a large-sized retroreflector 32 is made by arranging a plurality of flat plate blocks 11 forming the retroreflector 10 on the same plane, and a stereoscopic-image display device 31 is made by erecting a half mirror 33 on one side of or at the center of the large-sized retroreflector 32 in an orthogonal state.

In this stereoscopic-image display device 31, light emitted from an object D passes through the mirror 33, and a part of the light is reflected and is allowed to strike the large-sized retroreflector 32. In the large-sized retroreflector 32, light that has struck the retroreflector 32 is reflected as it is, and is again reflected by and is allowed to pass through the half mirror 33, and a real image E is formed.

In this case, the large-sized retroreflector 32 is made by arranging the flat plate blocks 11 forming the small-sized retroreflector 10, and therefore it is possible to make a large-sized one, and the first and second light reflecting surfaces 13 and 14 and the perpendicular light-reflecting surface 19 of each of the retroreflectors 10 are exposed, and therefore optical attenuation does not occur easily, and it is possible to form a brighter real image E.

Although the half mirror 33 is erected at the center of the large-sized retroreflector 32 in this embodiment, it is also possible to use only the half of the large-sized retroreflector 32, for example, as shown by line J-J' of FIG. 10.

The present invention is not limited to the aforementioned embodiment, and its configuration can be changed within a range within which the gist of the present invention is not changed.

Additionally, although the groove having a cross section of an isosceles right triangle formed by the first and second light reflecting surfaces 13 and 14 is a void in the aforementioned embodiment, it is also possible to fill the void with a transparent resin. In this case, it is possible to easily clean the surface without depositing dust or the like thereon although the optical transmission efficiency is lowered.

Additionally, although a metal-deposited surface on the upper side of the flat plate block is used in the aforementioned embodiment, it is also possible to make the flat plate block out of a transparent material, and to reverse it so as to become opposite in the top-bottom relationship to the aforementioned embodiment, and to use it in a state in which the metal-deposited surface is placed on the bottom side. In this case, it is possible to obtain a light reflecting surface that has superior planarity although the brightness falls because light passes through the transparent substance.

INDUSTRIAL APPLICABILITY

The retroreflector according to the present invention is capable of producing a retroreflector that is a unit of a large-sized retroreflector with precision and at low cost by use of, for example, a thermoplastic resin or the like, and therefore it becomes possible to form a large-sized stereoscopic-image display device having higher brightness in combination with a half mirror or the like.

Additionally, it is also possible to form a stereoscopic-image display device by use of this retroreflector without making a change.

REFERENCE SIGNS LIST

10: Retroreflector, 11: Flat plate block, 11a: Light reflecting groove, 12: Upper side, 13: First light reflecting surface, 14: Second light reflecting surface, 15: Partition wall, 16: Inclined light-reflecting surface, 17: Intersection line, 19: Perpendicular light-reflecting surface, 20: Light reflecting surface, 22: Light reflecting unit, 30: Retroreflector, 31: Stereoscopic-image display device, 32: Large-sized retroreflector, 33: Half mirror

The invention claimed is:
1. A retroreflector comprising:
light reflecting grooves arranged in parallel; and
partition walls that are arranged in parallel at predetermined intervals and that orthogonally intersect with the light reflecting grooves;
the light reflecting grooves and the partition walls being on an upper side of a flat plate block,
wherein the light reflecting groove is provided with first and second light reflecting surfaces that orthogonally intersect with each other,
the partition wall is provided with a draft that upwardly becomes smaller in width, and the partition wall has a perpendicular light-reflecting surface that orthogonally intersects with the first and second light reflecting surfaces on one side of the partition wall, and
the first and second light reflecting surfaces and the perpendicular light-reflecting surface operate as cubic corners, and perform retroreflection.

2. The retroreflector according to claim 1, wherein the partition wall is provided with an inclined light-reflecting surface that is disposed so as to be inclined with respect to the first and second light reflecting surfaces in a non-orthogonal state and that intersects with the first and second light reflecting surfaces at a same angle on one other side of the partition wall, the retroreflector being usable also as a stereoscopic-image display device using the first and second light reflecting surfaces and the inclined light-reflecting surface.

3. The retroreflector according to claim 1, wherein a height h of the partition wall falls within such a range as to be $0.9a \leq h \leq 1.5a$ with respect to a height a of a cross section of a right-angled triangle formed by the first and second light reflecting surfaces.

4. The retroreflector according to claim 2, wherein a height h of the partition wall falls within such a range as to be $0.9a \leq h \leq 1.5a$ with respect to a height a of a cross section of a right-angled triangle formed by the first and second light reflecting surfaces.

5. The retroreflector according to claim 1, wherein a width w1 of a maximum thickness part of the partition wall falls within such a range as to be $0.1b \leq w1 \leq 1b$ with respect to a length b of an intersection line of the first and second light reflecting surfaces.

6. The retroreflector according to claim 2, wherein a width w1 of a maximum thickness part of the partition wall falls within such a range as to be $0.1b \leq w1 \leq 1b$ with respect to a length b of an intersection line of the first and second light reflecting surfaces.

7. A set of retroreflectors characterized by arranging a plurality of retroreflectors each of which is the retroreflector according to claim 1 in an orderly manner on a same plane.

8. A set of retroreflectors characterized by arranging a plurality of retroreflectors each of which is the retroreflector according to claim 2 in an orderly manner on a same plane, and by being used as a stereoscopic-image display device.

\* \* \* \* \*